Patented Jan. 11, 1944

2,338,830

UNITED STATES PATENT OFFICE 2,338,830

CHEMICAL PROCESS AND PRODUCT

James H. Werntz, Wilmington, Del., assignor to E. I. du Pont de Nemours & Company, Wilmington, Del., a corporation of Delaware No Drawing. Application May 6, 1941, Serial No. 392,137

5 Claims. (Cl. 260—513)

This invention relates to the preparation of sulfonic acids.

Sulfonic acids of high surface-active efficiency are becoming increasingly important for use in various industrial operations and it is desirable to find new and cheaper intermediates for their preparation. Petroleum hydrocarbons offer perhaps the cheapest source of raw materials for the manufacture of intermediates for conversion to sulfonic acids. Petroleum hydrocarbons have previously been heated with sulfur but in general the conditions of treatment were such that hydrogen sulfide was formed in large amounts and the other products were for the most part cyclic in nature, and unsuited for conversion to surface-active sulfonic acids.

This invention has as an object the preparation of new chemical compounds having surface active properties. A further object is to manufacture these new compounds by novel and easily conducted processes which give high yields of relatively high quality products. A still further object is to apply these new compounds in various connections wherein surface active agents are commonly employed.

The above and other objects appearing hereinafter are accomplished by oxidizing a sulfurized open chain mono-olefin hydrocarbon having 6 or more carbon atoms and at least one hydrogen atom attached to each carbon atom of the ethylenic bond and containing at least 2.5 atoms of sulfur per mole of olefin. In practicing this invention as a batch operation the sulfurized olefin is added dropwise with stirring to the oxidizing agent under conditions providing for the control of the reaction at a temperature between 40° and 80° C. After all the olefin has been added to the oxidizing agent, the reaction mixture is neutralized with caustic alkali and extracted with an organic solvent, e. g., ethyl ether. The aqueous layer is separated and evaporated to dryness to recover the alkali metal sulfonate.

Oxidation with 70% nitric acid gives substantially quantitative yields of hydroxysulfonic acids. Oxidation with sodium hypochlorite solutions, on the other hand, yields mixtures of 1,2-disulfonic acids and hydroxy sulfonic acids and oxidation with chlorine yields sulfonyl chlorides which can be hydrolyzed to sulfonic acids.

The following examples are submitted to illustrate and not to limit this invention. Parts are by weight, unless otherwise stated.

EXAMPLE I

*Sulfonic acids by oxidation of sulfurized pentadecene-8*

Thirty and six tenths parts of sulfurized pentadecene-8 containing 31.2% sulfur is added dropwise to 162 parts of 70% nitric acid while stirring in a glass vessel at 80° C. The reaction is very vigorous and exothermic so the temperature is dropped to 65° C. The oil is added over one hour and the reaction mixture is then heated four hours at 80° C. The resulting yellow oil is soluble in water to give persistently sudsing solutions. The product is diluted with 300 parts of water and neutralized with 295 parts of 10% sodium hydroxide solution. The aqueous solution is extracted with ethyl ether to remove 6.5 parts of an oil which is largely soluble in water and surface-active. The aqueous layer is next evaporated to dryness on the steam bath and extracted repeatedly with ethyl alcohol. The alcohol is evaporated and the solid again taken up in boiling alcohol, filtered, and on evaporation leaves 21 parts of brown solid. The product is very soluble in water and gives clear light yellow, strongly foaming solutions which at very low concentrations wet powdered sulfur. The product analyzes 8.7% sulfur and has an hydroxyl number of 178. $C_{15}H_{30}(OH)SO_3Na$ calculates 9.7% sulfur and has a calculated hydroxyl number of 170. The product is found to be a good scouring agent in hard water and is an active wetting agent when tested by the method of Draves & Clarkson (American Dyestuffs Reporter 20, 201 (1931)).

EXAMPLE II

*Sulfonic acids by oxidation of sulfurized hexadecene-1*

Twenty-four parts of sulfurized hexadecene containing 28.7% sulfur is added over about one hour to 120 parts of 70% nitric acid at 60° C. The reaction mixture is then heated and stirred at 80° C. for about 3 hours. The product is diluted with 100 parts of water and neutralized with 50 parts of 30% sodium hydroxide solution. Some sulfur precipitates and is filtered off. The aqueous solution is evaporated to dryness and extracted repeatedly with hot ethyl alcohol. Evaporation of the alcohol leaves 18 parts of light brown, brittle hygroscopic solid which analyzes 7.9% sulfur. $C_{16}H_{32}(OH)(SO_3Na)$ calculates 9.3% sulfur. This product is an excellent wetting agent and scouring agent, particularly in hard water.

EXAMPLE III

*Sulfonic acids by oxidation of sulfurized polymer of ethylene*

Sixteen and seven tenths parts of a sulfurized ethylene polymer containing 18.7% sulfur and having an average composition corresponding to $C_{29}H_{58}S_3$ is added to 54 parts of 70% nitric acid at 70–75° C. After heating three additional hours on the steam bath, the product is diluted with 100 parts of water and neutralized with 36 parts of 30% sodium hydroxide solution. The aqueous solution is evaporated to dryness on the steam bath and the product is extracted with boiling alcohol. Evaporation of the alcohol leaves 9 parts of brown, brittle hygroscopic solid which is soluble in water to give a weakly sudsing solution. The product is a good detergent in soft water.

EXAMPLE IV

*Sulfonic acids by oxidation of sulfurized pentadecene-8*

Ten parts of sulfurized pentadecene-8 containing 31.2% sulfur is suspended in 100 parts of water at a temperature below 10° C. and while stirring at this temperature, chlorine gas is bubbled into the reaction mixture. The resulting sulfonylchloride is extracted from the reaction mixture with ether and washed with 10% sodium bisulfite solution. The ether solution is filtered, evaporated on the steam bath and the sulfonylchloride hydrolyzed with 30% sodium hydroxide solution. The reaction at the steam bath temperature is very vigorous. The sodium salt of the sulfonic acid when diluted with water gives a persistently foaming solution.

EXAMPLE V

*Sulfonic acids by oxidation of a sulfurized pentadecene-8*

A solution of 51.4 parts of chlorine and 63 parts of sodium hydroxide in 225 parts of water is prepared and added dropwise to a suspension of 30.6 parts of sulfurized pentadecene-8 containing about 3 atoms of sulfur and 32.5 parts of sodium carbonate in 360 parts of water. The reaction mixture is heated to 85° to 90° C. with stirring. After a second treatment with sodium hypochlorite solution a small amount of undissolved oil is separated and the aqueous layer is saturated with sodium chloride and concentrated on the steam bath. On cooling, an oil layer separates and is dissolved in hot ethyl alcohol and filtered. Evaporation of the alcohol left 15.5 parts of a brown brittle solid containing less than 1% water which analyzed 12% sulfur and has a hydroxyl number of 120. A product having the empirical composition $C_{15}H_{30}(OH)_{0.7}(SO_3Na)_{1.3}$ calculates 11.7% sulfur and has a hydroxyl number of 110.

As intermediates for oxidation to sulfonic acids there can be employed the sulfurized monoolefin hydrocarbons containing at least 2.5 and preferably about 3 atoms of sulfur per mol of olefin prepared from open chain monoolefin hydrocarbons having 6 or more carbon atoms and at least 1 hydrogen atom on each doubly bonded carbon atom as described in the copending application S. N. 392,136, filed May 6, 1941. These intermediate compounds may be characterized as sulfurized hydrocarbons whose molecular formula is $C_nH_{2n}S_x$ in which $C_nH_{2n}$ radical is derived from a primary or secondary olefin, $n$ is an integer greater than 5 and $x$ is a number greater than 2.5, preferably from 2.5 to 3.5. Examples of suitable olefins for sulfurization in accordance with the processes described in the aforementioned copending application include hexene-3, heptene-2, tridecene-7, nonadecene-10, 3,9-diethyl tridecene-6, dodecene-1, octene-1, heptadecene-7, heptadecene-8, olefins obtained by decarboxylation of such acids as oleic acid, 1-undecylenic acid, etc., olefins obtained by decarbonylation of 9,10-octadecenyl alcohol and such unsaturated alcohols as are obtained by the sodium reduction of sperm oil, olefins obtained by the dehydration of the saturated alcohols obtained by the carboxyl reduction of natural fats and waxes such as coconut oil, beef tallow, beeswax, etc., cracked wax distillates and the unsaturated polymers of ethylene.

Nitric acid of at least 70% concentration is the preferred oxidizing agent for oxidizing the sulfurized hydrocarbons mentioned above to sulfonic acids. There can also be employed other vigorous oxidizing agents such as chromic acid anhydride or potassium permanganate to accomplish this result. Under certain conditions and particularly at elevated temperatures sulfonic acids are formed when the oxidation is carried out with free halogen, hypohalogenous acids and their salts such as sodium and potassium hypochlorite, potassium chlorate, sodium chlorate, air in the presence of traces of osmium tetraoxide, perchloric acid, iodic acid, hydrogen peroxide and its organic and inorganic derivatives as for example peracetic acid, benzoyl peroxide, persulfuric acid, chromic acid, sodium chromate, potassium dichromate, particularly in acid solutions, etc. If desired the oxidation can be carried out electrolytically.

In carrying out the oxidation of the sulfurized hydrocarbons with nitric acid, it is frequently desirable to employ an inert solvent, such as carbon tetrachloride, trichloroethylene, etc. Sometimes it is necessary to initiate the reaction by the addition of small amounts of fuming nitric acid and warming to about 50° to 75° C. Reaction is indicated by the vigorous evolution of the fumes of the oxides of nitrogen. Sometimes it is desirable to oxidize a small amount of the sulfurized hydrocarbon with a small amount of nitric acid and then, after reaction has started, to add additional quantities of the sulfurized hydrocarbon and nitric acid slowly to the reaction mixture. While temperatures ranging from 0° to 100° C. have been used for the nitric oxidation, the reaction can be carried out below 0° C. and above 100° C. but it is preferred to use temperatures of about 50° to 75° C. At low temperatures, the reaction becomes sluggish while at high temperatures the reaction is difficult to control.

The sulfonic acids described herein can be used as such but generally they are converted to their alkali metal salts by neutralization with an alkali metal hydroxide such as sodium hydroxide. The potassium, ammonium, calcium, and magnesium salts can also be prepared and used. Suitable salts of the sulfonic acids described herein may also be made from such amines as dimethylamine, ethylamine, monoethanolamine, diethanolamine, triethanolamine, butylamine, glucamine, methyl glucamine, pyridine, piperidine, cyclohexylamine, aniline, toluidine, etc. The term sulfonic acid as used herein is intended to refer generically to the sulfonic acid, irrespective of how or whether the acid hydrogen of the sulfonic group has been neutralized.

The new compositions of this invention belong to the class of surface-active or capillary-active materials in that they have colloidal properties and may therefore be advantageously used in any process involving wetting, penetrating, deterging, dispersing, emulsifying, foaming, and kindred phenomena. These compositions can be employed in pure or standardized form and if desired in conjunction with known processing or treating agents. They can be used by themselves or in combination with other surface-active agents in any relation in which surface-active agents having colloidal properties have heretofore been used.

As many apparently widely different embodiments of this invention may be made without departing from the spirit and scope thereof, it is to be understood that this invention is not to be limited to the specific embodiments thereof except as defined in the appended patent claims.

I claim:

1. A process for the preparation of hydroxy sulfonic acids containing not more than one sulfonic acid group, which comprises admixing with nitric acid of at least 70% concentration a monomeric polysulfide whose molecular formula is $C_nH_{2n}S_3$, in which $n$ is an integer greater than 5, and which is obtained by heating with sulfur an open-chain monoolefin hydrocarbon of at least 6 carbon atoms selected from the group consisting of primary and secondary olefines, the proportion of sulfur to monoolefin hydrocarbon being about three atomic proportions of sulfur per mole of monoolefin hydrocarbon.

2. Hydroxy sulfonic acids containing not more than one sulfonic acid group, obtained by admixing with nitric acid of at least 70% concentration a monomeric polysulfide whose molecular formula is $C_nH_{2n}S_3$, in which $n$ is an integer greater than 5, and which is obtained by heating with sulfur an open-chain monoolefin hydrocarbon of at least 6 carbon atoms selected from the group consisting of primary and secondary olefins, the proportion of sulfur to monoolefin hydrocarbon being about three atomic proportions of sulfur per mole of monoolefin hydrocarbon.

3. The hydroxy sulfonic acid containing not more than on sulfonic acid group, obtained by admixing with nitric acid of at least 70% concentration the monomeric polysulfide whose molecular formula is $C_{16}H_{32}S_3$ obtained by heating hexadecene-1 with sulfur in the proportion of about three atomic proportions of sulfur per mole of hexadecene-1.

4. The hydroxy sulfonic acid containing not more than one sulfonic acid group, obtained by admixing with nitric acid of at least 70% concentration the monomeric polysulfide whose molecular formula is $C_{15}H_{30}S_3$ obtained by heating pentadecene-8 with sulfur in the proportion of about three atomic proportions of sulfur per mole of pentadecene-8.

5. The hydroxy sulfonic acids containing not more than one sulfonic acid group, obtained by the mixing with nitric acid of at least 70% concentration, the sulphurized ethylene polymer having a molecular formula corresponding substantially to $C_{29}H_{58}S_3$ and containing 18.7% sulphur.

JAMES H. WERNTZ.

CERTIFICATE OF CORRECTION.

Patent No. 2,338,830.  January 11, 1944.

JAMES H. WERNTZ.

It is hereby certified that error appears in the printed specification of the above numbered patent requiring correction as follows: Page 3, second column, line 7, claim 3, for "than on" read --than one--; and that the said Letters Patent should be read with this correction therein that the same may conform to the record of the case in the Patent Office.

Signed and sealed this 28th day of March, A. D. 1944.

(Seal)

Leslie Frazer
Acting Commissioner of Patents.